(12) United States Patent
Salzer et al.

(10) Patent No.: US 6,756,558 B2
(45) Date of Patent: Jun. 29, 2004

(54) HIGH CURRENT, LOW IMPEDANCE RESISTANCE WELDING DEVICE

(75) Inventors: Thomas E. Salzer, Bedford, MA (US); Dennis K. Briefer, Berlin, MA (US); George Becker, Medway, MA (US)

(73) Assignee: Centaur, Inc., Bedford, MA (US)

( * ) Notice: Subject to any disclaimer, the term of this patent is extended or adjusted under 35 U.S.C. 154(b) by 50 days.

(21) Appl. No.: 10/161,119

(22) Filed: May 31, 2002

(65) Prior Publication Data

US 2003/0222056 A1 Dec. 4, 2003

(51) Int. Cl.$^7$ ................................................ B23K 11/24
(52) U.S. Cl. ........................ 219/112; 219/116; 307/419
(58) Field of Search ................................. 219/112, 113, 219/116, 108; 307/419

(56) References Cited

U.S. PATENT DOCUMENTS

| | | | |
|---|---|---|---|
| 2,942,214 A | 6/1960 | Fruengel | |
| 3,211,885 A | * 10/1965 | Fischer | ........................ 219/113 |
| 4,417,122 A | 11/1983 | Thorne | |
| 4,496,812 A | 1/1985 | Carley et al. | |
| 4,496,821 A | 1/1985 | Burgher et al. | |
| 4,525,618 A | 6/1985 | Beneteau | |
| 4,612,455 A | * 9/1986 | Weiner et al. | ............... 307/419 |
| 5,030,813 A | 7/1991 | Stanisz | |
| 5,128,511 A | 7/1992 | Stanisz | |
| 6,037,558 A | 3/2000 | Geiermann et al. | |

OTHER PUBLICATIONS

McGraw–Hill Dictionary of Scientific and Technical Terms, 1989, p. 1944.*
Frank Frungel, "High Speed Pulse Technology", vol. 1, 1965, Academic Press, New York and London.
Frank Frungel, "High Speed Pulse Technology", vol. 3, 1976, Academic Press, New York and London.

* cited by examiner

Primary Examiner—Clifford C. Shaw
(74) Attorney, Agent, or Firm—AKC Patents; Aliki K. Collins (57) ABSTRACT

A resistance welding apparatus characterized by very low output impedance, and providing a substantially constant voltage source to low impedance (e.g., resistances on the order of 1–100 micro-ohms) materials-to-be-joined. The welding apparatus includes one or more primary and secondary winding pairs disposed about a high permeability core with the secondary coil(s) positioned between the primary coil(s) and the core. In a preferred form, the secondary coil(s) are capable of delivering more than 75,000 amperes of welding current. The welding apparatus is lighter, more cost efficient, and more energy efficient than conventional systems.

20 Claims, 4 Drawing Sheets

HIGH CURRENT, LOW IMPEDANCE RESISTANCE WELDING DEVICE

FIELD OF THE INVENTION

This invention relates to resistance welding machines in general, and specifically to capacitive discharge resistance welders.

BACKGROUND OF THE INVENTION

In resistance welding, fusion of two or more electrically conductive materials is effected by resistance heating caused by the passage of high current pulses through the conductive members being joined. The temperature rise effecting the weld is substantially proportional to the current squared times the resistance in the weld region, but is somewhat increased by the duration of the applied current.

Prior art resistance welding equipment has been built using principles developed by Fruengel. See High Speed Pulse Technology Vol. 1 by Frank Fruengel, Academic Press 1965. Transformed Capacitor Discharge in Welding pp345–347. In volume 3, pp310–311, Fruengel describes the resistance welding equipment that was available as of the publication date.

Another form of prior art welder utilizes transformed mains power to provide weld current pulses thereby eliminating the requirement for energy storage. The limitations of this technology can be illustrated by the realization that if 100,000 amperes at 5 volts is required to make a weld, then at 100 percent efficiency, a 220 volt main would be required to supply over 2000 amperes of current. The use of 3 phase mains can reduce the current requirement, however, direct transformation machines that are capable of producing more than 100,000 amperes of weld current are very expensive, massive, and require very large mains capacity.

Weldments produced by resistance welding find applications in many fields including the hermetic sealing of optoelectronic components, semiconductor and hybrid circuit packages, packaging of micro electro mechanical systems (MEMS), surface acoustic wave devices (SAW), hermetic feed-thrus, diaphragms for transducers, rupture discs, automotive, aircraft, and the like, or other applications requiring a continuous weld. Similar power supplies to those used in resistance welding systems are used in both magnetizers for permanent magnets and in devices that magnetically form metallic sheets.

Continuous welds are often required to prevent the passage of fluids and gasses across the weld boundary, in addition to providing required mechanical integrity. For this reason, continuous welds are often used for hermetic sealing. In previous welding equipment, only relatively short weld perimeters could be continuously welded with a single discharge pulse. As weld perimeters exceeded the capability of available equipment to produce satisfactory welds, industry turned to other methods, such as seam welding, in which a series of small overlapping welds provide the required hermeticity. Seam welding is considerably slower than projection welding which provides a continuous weld in a single discharge. Also, the seam welding process dissipates considerably more heat into the part being welded than projection welding, thereby raising its bulk temperature well above what is required with projection welding. In addition, the strength of seam welds tends to be lower than projection welds.

Conventional resistance welding equipment is designed to supply a relatively high welding current into a variety of weldment metals and geometries. The impedance of structures-to-be-joined of may be from a few micro-ohms to over 100 micro-ohms. This variation in weld impedance is caused by the composition of the weld metals, the thickness of the weld metals, and the geometry of the structures-to-be-joined. A prior art welding machine that is designed to supply a constant high weld current to a low impedance (e.g. a 100 micro-ohm) weldment will not perform in an optimum manner. This is because the welding supply acts as a constant current source when welding very low impedance welds.

Although prior art system are capable producing welding currents of 60,000 amperes, such systems typically waste 90% of the energy stored in the capacitors, and encounter both reactive and resistive losses associated with bus bars, transformers, and the weld head. To overcome this waste, relatively large sizes and expenses are associated with these components. Mains power connections are required that are similar to a commercial substation. As a result, the prior art systems require considerable effort to install and move.

In resistance welding, a weldment is always comprised of metal parts which possess a coefficient of resistance that varies with temperature, as well as geometrical, compositional, and surface variations. These factors result in both static and dynamic variations in the resistance of the weldments, and can lead to local overheating during the welding process. The impedance of the weld undergoes dynamic resistance changes caused, in part, by weld current-induced joule heating. Because the coefficient of resistance change with temperature is positive for commonly welded metals, the resistance change during welding is in a positive direction. When welding is performed by a constant current source, as with conventional welders, the dynamically increasing resistance of the weld results in a rapid increase in power dissipation during the weld process. This can result in a local overheating condition which may adversely affect the reliability of the welded components. This so-called "thermal runaway" condition, due to high constant current, cannot occur when using constant voltage or proper impedance source regardless of risetime. This eliminates expulsion of particles from the melting material in the weld region. Expelled particles may cool and become a source of internal contamination which may be injurious to the reliability of the component.

Another limiting factor in conventional welding machines, is the ability to maintain mechanical force on a rapidly melting weld, and the requirement to accelerate the welding electrodes to maintain force on the contours of the melting structures. To do so effectively, it is essential to reduce the mass of the inertial components of the welding machine. Yet, in conventional welders after reducing mass has been accomplished, it is still possible to generate welding current pulses that melt the weldment more rapidly than mechanical components have the ability to maintain force, again resulting in particle expulsion.

In an exemplary conventional pulsed high current welder, a large bank (typically 4 feet high by 3 feet wide by 3 feet deep) of high energy storage capacitors are charged by a power supply requiring a 208–440 volt 20–100 ampere source of alternating voltage. High current electronic switches discharge the energy storage capacitors into a transformer, which can weigh 400 to 2000 pounds or more. The massive copper secondary connects by means of relatively massive, for example 4 inch by ½ inch, copper bus bars which may be up to several feet in length, to connect the output of the transformer to the input of the welding head.

The welding head may be enclosed in a chamber which provides proper environmental gas mixtures. The two large copper bus bars and an insulating spacer must penetrate the wall of the environmental chamber in order to conduct the entire welding current through the chamber wall. The function of the welding head is to conduct the weld current through suitable electrodes to the weldment, to hold the electrodes in proper alignment during the welding process, and to provide proper static and dynamic clamping force to effect the weld.

Thus, in the generation of high current pulses, prior art welding devices require expensive, relatively massive transformers, and large amounts of energy storage (due to the inefficiency of the conversion of energy stored in the capacitors) for power to be delivered to the weld load. In addition, large expensive power supplies are used due to the inefficiency of prior art devices. Those prior art weld power supplies consequently also require high power (heat) dissipation, and access to high current mains. Relatively high expense is incurred for wiring, heat dissipation, and operating energy usage. In fact, mains current requirements may preclude the use of many prior art welding machines.

Accordingly, it is an object of the invention to provide an improved resistance welding apparatus.

Another object is to provide an improved welding apparatus characterized by relatively small size, weight power consumption and cost.

Yet another object is to provide an improved welding apparatus characterized by high efficiency.

Yet another object of this invention is to provide an improved welding apparatus that will weld relatively long continuous perimeters with low current demand from power mains.

SUMMARY OF THE INVENTION

The invention is a resistance welding apparatus that supplies essentially high current, constant voltage pulses to very low impedance weld structures. The high current pulses of substantially constant voltage are provided with substantially smaller, less massive, less expensive equipment requiring less energy storage for equivalent welds, than the prior art devices.

The thermal runaway condition that is caused by the use of constant current sources of the prior art is largely mitigated by the use of welding power supplies of the present invention that behave more like constant voltage sources. When a low impedance voltage source is used for welding, the magnitude of the weld current is modulated by the dynamically changing resistance of the weld to change the magnitude of the weld current, thereby minimizing the occurrence of particle expulsion. Expulsion can also be exacerbated by the use of shorter than conventional current rise times.

Moreover, with the invention, the low impedance voltage pulses can be selectively varied in duration. When used in conjunction with a dynamically applied force to the weldment, the particle expulsion effect encountered by prior art systems is eliminated by selecting an appropriate pulse width for the welding application. Also some weld configurations require longer pulse times to reach the required thermal distribution.

The welding apparatus according to the invention, provides substantially higher output current per unit weight and or per dollar cost, than prior art devices. Further the invention effects substantial reduction in bulk and cost for its power supply. Further, the invention permits usage in locations where current mains are insufficient to power prior art devices. As another feature the invention is that it provides a means for high current welding which does not require penetration of a high current welding bus through the wall of an environmental chamber.

The invention describes means applicable to portable welders. Such welders are required for the assembly of motor vehicles, ships, aircraft, and the like. The features which provide the high efficiency of the welding apparatus of the invention are particularly useful for welders intended for these industries. Handheld units may be made considerably smaller and lighter than conventional portable welders. Welders that are positioned by robots are generally much lighter and cost less.

The welding apparatus of the present invention in one form utilizes energy from ordinary low current mains, 120 volt, typically 15 ampere power sources. The apparatus stores the energy in one or more banks of capacitors, each connected to a switch for power control, and producing therefrom, low voltage, current pulses of adjustable width and amplitudes between 1000 amperes and 5,000,000 amperes. Associated with the invention is a welding head and integral pulse transformer, power supply, energy storage, energy discharge means, and mechanical force and guidance means. In a preferred form, the apparatus includes consists of a weld head with an integral pulse transformer, and an associated driver for the pulse transformer. The transformer portion of the apparatus includes a core of magnetically permeable material surrounded by a relatively wide set of two or more alternating insulated layers of high conductivity material which constitute primary and secondary conductive windings respectively. The relatively high conductance secondary layer immediately adjacent to said core combined with a low reactance secondary circuit acts as a shield to the core for the magnetic field generated by the peripheral primary winding.

In operation, immediately prior to a main discharge pulse, the core is magnetically saturated in the direction opposite ("reverse flux saturated") to that produced by the primary winding voltage. The combination of low inductance and reverse flux saturation reduces the required weight of the transformer to a level typically ten times lower than would otherwise be required in accordance with the prior art. In contrast, prior art devices allow the magnetic field of the core to return to its remnant state. The apparatus of the invention reverses the flux state of the core to be at or near reverse saturation. One or more low inductance bus configuration output conductors corresponding to the number of paired primary and secondary windings are used to deliver current through the welding head to the parts-to-be-joined. A high efficiency power supply is used to minimize the cost, weight, and power usage of the apparatus. In a preferred form, the apparatus controls the force applied to the parts-to-be-joined before, during, and after the high current welding pulse is applied.

In a preferred form of the invention, the transformer and welding head functions are performed in combination in a single unit, providing a size reduction and increase in efficiency compared to devices of the prior art. This combination of functionality eliminates losses incurred by transferring the welding current from a transformer to the load or part being welded. In prior art welders, in contrast, the electrical conductors that connect the welding head to the transformer cause resistive losses, and reactive storage of energy in the fields surrounding the conductors decreases the available energy to transfer to the weld joint.

BRIEF DESCRIPTION OF THE DRAWINGS

Other features and advantages of the present invention will be apparent from the following detailed description of the drawing in which.

DETAILED DESCRIPTION OF THE PREFERRED EMBODIMENT

Figure 1:
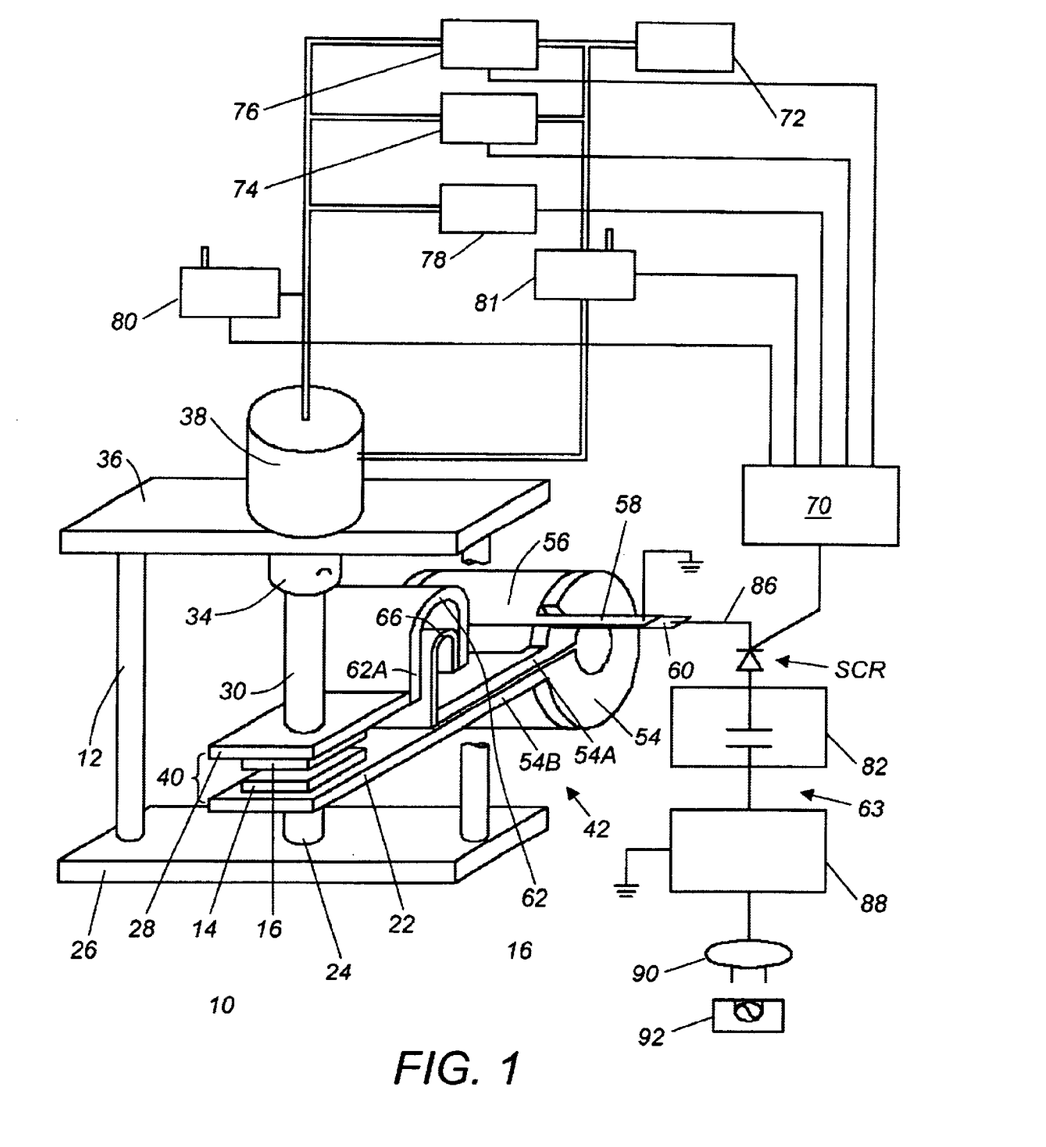
FIG. 1 shows a simplified exploded view of the output head and integral pulse transformer of a welding apparatus in accordance with the invention.

A preferred form of the welding apparatus of the invention 10 is shown in FIG. 1. The apparatus 10 includes a positioning portion 12 for supporting parts-to-be-joined by the system 10. The positioning portion 12 includes a pair of opposed (bottom and top) electrodes 14 and 16 between which parts-to-be-welded are placed. The bottom electrodes 14 and an underlying lower electrode support plate 22 is supported at a fixed height by support member 24 extending from base 26 of a frame. The top electrode 16 and an overlying upper electrode support plate 28 are positioned by a support element 30 moveable through a guide 34 held by an upper member 36 of the frame. A motor (force means) 38 is controllably coupled to the support member 30 to drive electrode 16 with respect to stationary electrode 14, to provide a controlled force to parts-to-be-joined positioned between electrodes 14 and 16. The electrodes 14 and 16 and their respective support plates form a principal parts of a welding head.

The lower and upper electrodes 14 and 16 are respectfully electrically connected to a pulse transformer assembly 42, which is integral to the welding held. The pulse transformer 42 is shown in exploded form in FIG. 2.

Figure 2:
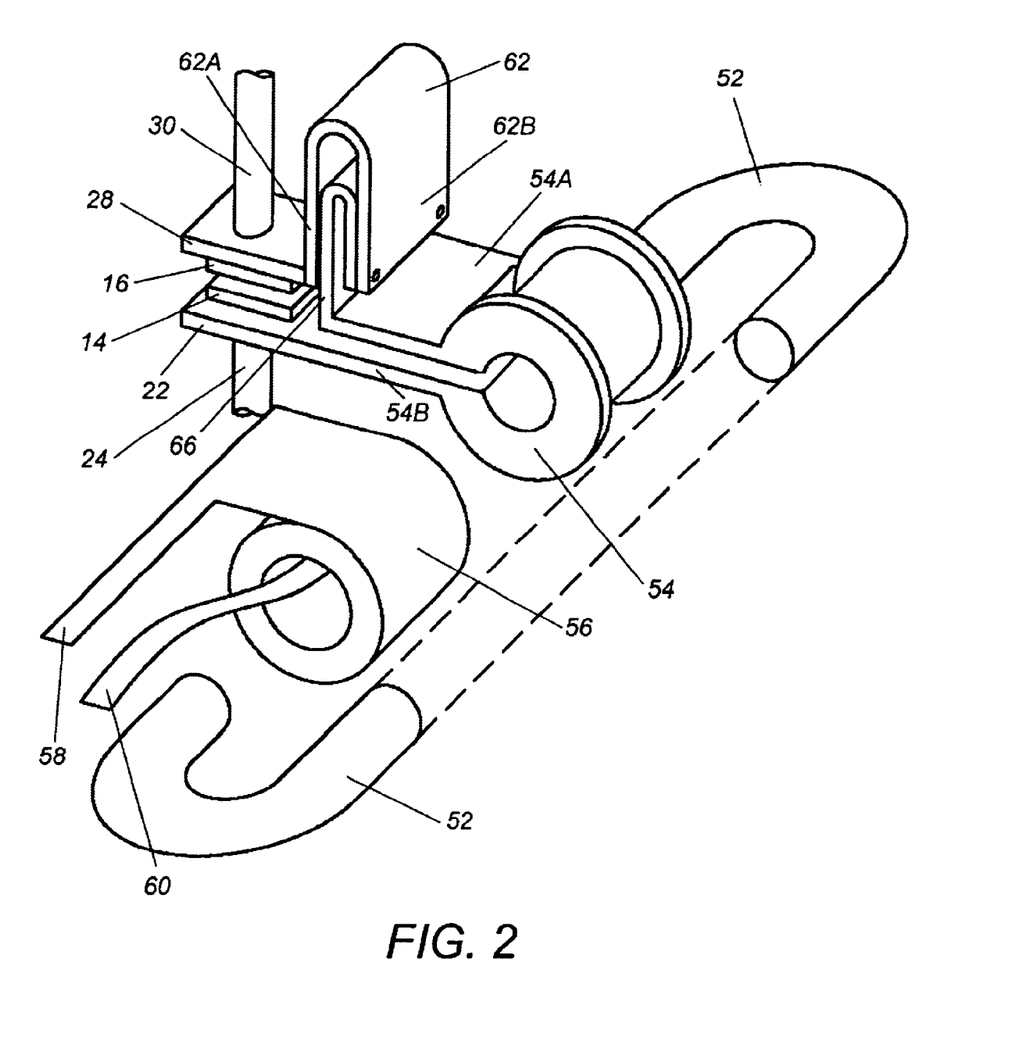
FIG. 2 shows a schematic for an exemplary welding apparatus in accordance with the invention.

In the configuration shown in FIGS. 1 and 2, a high permeability toroidal magnetic core 52 is immediately surrounded by inner secondary winding 54. Wound on secondary winding 54 is a primary winding 56, extending between terminals 58 and 60. Terminals 58 and 60 provide electrical connection for the primary winding to a voltage drive system 63.

In the preferred embodiment, the toroid 52 is a unitary structure. In alternative embodiments, the toroid can be cut one or more times (so that preassembled windings may be installed thereon), and then prior to use, mechanically joined at the cuts to form a low reluctance, closed flux path.

The voltage drive system 63 includes silicon controlled rectifier SCR that is selectively driven (under the control of a controller 70, described below) to provide the current pulses (from a capacitor storage array 82) by way of line 86 to terminal 60 of the primary winding 56. The other terminal 58 of winding 56 is coupled to a system ground. A conventional charging network 88 is used to charge the capacitors in array 82, using a conventional coupling 90 to a simple 110 volt, 15 amp line 92.

One end of 54A, the inner secondary winding, 54 is electrically connected to the upper electrode support plate 28 by way of a flexible strap 62. The other end 54B of inner secondary winding 54 is electrically connected to support plate 22. One end 62A of the flexible strap 62 connects to the upper electrode support plate 28. The other end of flexible strap 62, 62b, connects to terminal 60. An "inverted-U" extension 66 of the end 54A of inner secondary winding 54, located in close proximity to the upper end of said inner secondary winding 54, and is shaped such that the extension 66 is in close proximity to the flexible strap 66 when the upper electrode support plate 28 is in the lowered position. The lower electrode support plate 22 is attached and in close proximity to the lower end 54B of said inner secondary winding 54. The upper electrode support plate 28 is attached and in close proximity to the extension 66 end of the inner secondary winding 54. The flexible strap 66 permits motion of plate 28 (with respect to plate 22) so that the motor (force means) 38 can selectively apply a desired force to parts-to-be-joined that are between the opposed electrodes 14 and 16.

In operation, a weld sequence is initiated a controller 70, preferably a computer, programmable logic controller or micro-controller or hardware logic which controls the apparatus. The guide 34 maintains radial alignment between the upper and lower electrode support plates 22 and 28. Guide 34 allows motion with two degrees of freedom; vertical along the axis of guide 34 and rotational about that axis. In the preferred embodiment, rotation of the upper electrode plate 28 and electrode 16 is minimized by the radial stiffness of the flexible strap 66. Further constraint of rotary motion of the upper electrode holder 28 and electrode 16 is provided by the use of alignment pins in upper and lower electrodes 14 and 16.

In the preferred embodiment, a low mass piston assembly is used in the pneumatic cylinder as forcer 38. The frame provides a support means for the high welding current electromechanical portions of the preferred embodiment. The symmetrical construction of the frame maintains electrode alignment despite induced bending moments, such that parallelism of the surfaces of the weld electrodes 14 and 16 are maintained during the application of welding forces. The forcer 38 provides linear motion and axial force.

After initialization of the weld cycle, gas flowing from a gas source 72 into forcer 38 is controlled by valves 74 and 76. In another embodiment two valves in series may be used to control gas flow for safety reasons. Valve 74 has a high flow rate enabling fast motion. Valve 76 has a lower flow rate to allow slow motion of the forcer 38 prior to contact of the weld electrodes with the parts-to-be-welded. After electrode contact, valve 74 is opened to allow rapid pressurization of the forcer 38. Valve 74 allows slow pressurization of the forcer after contact of the weld electrodes until the final desired force is achieved as determined by a pressure transducer 78. During this cycle, an exhaust valve 80 is closed. Discharge of storage capacitors 82 is now initiated through discharge control line 86. After weld current has passed, and weld cooling time allowed, the exhaust cycle begins by opening a return valve 81, closing intake valves 74 and 76 and opening exhaust valve 80. Return time is controlled by the use of a variable restriction flow valve in series with either exhaust valve 80 or return valve 81 or a combination thereof.

Figure 3:
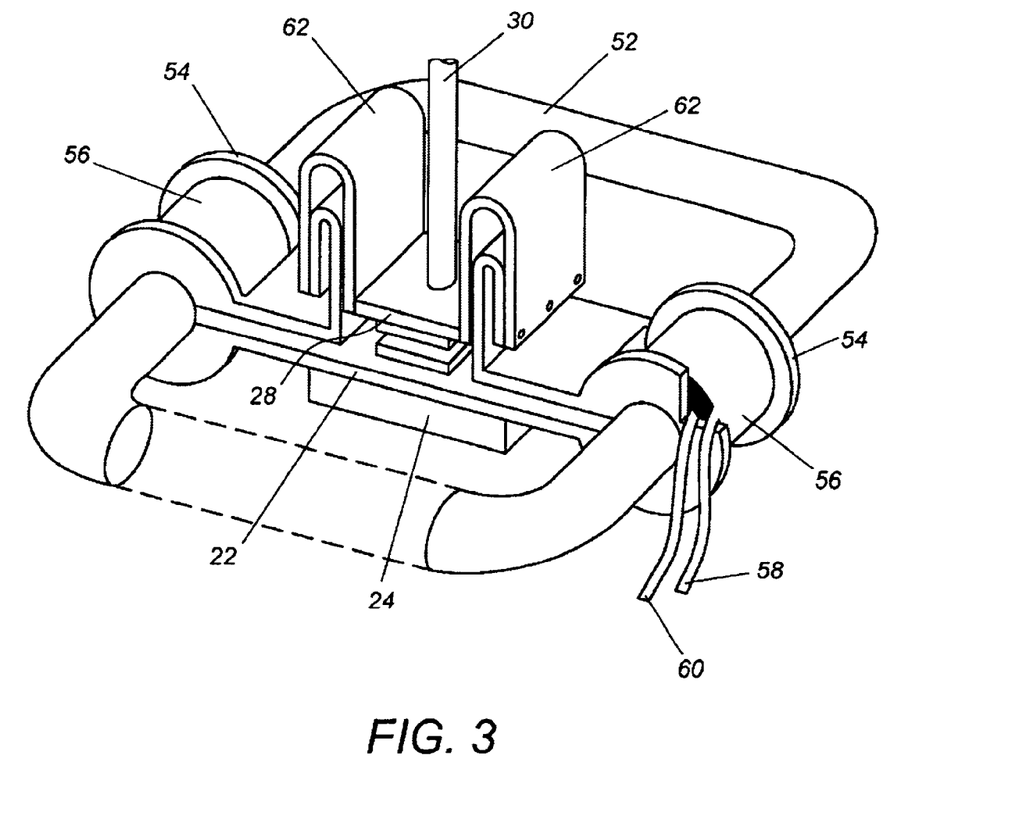
FIG. 3 shows an alternative arrangement of dual winding pairs disposed around a core for higher power operation.

FIG. 3 shows an alternative weld head/transformer configuration comprising two winding pairs disposed around a single core for enabling relatively high power operation.

Figure 4:
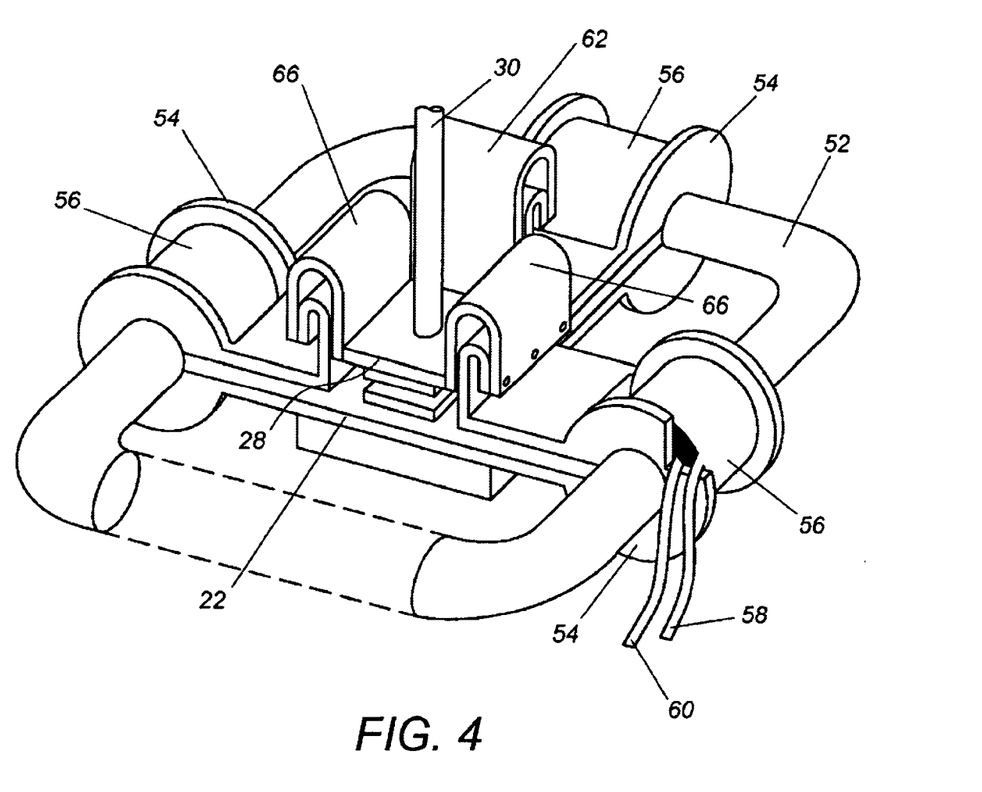
FIG. 4 shows an alternative arrangement of three winding pairs disposed around a core for higher power operation.

FIG. 4 shows another alternative configuration comprising three winding pairs disposed around a single core for relatively high power operation.

Additional winding pairs may be disposed around the core or (or multiple) cores to increase power output. The invention allows operation from ordinary commonly available mains while providing output currents and repetition rates similar to prior art machines which require substantially more power. The efficiency improvements of the invention are in part due to close coupling of weld transformer to weld head and the high efficiency power supply construction.

In the preferred embodiment, pneumatic force is applied through the use of a low mass piston assembly. The electrode position is maintained through the use of guides similar to a die set, while force is generated and applied along an axis controlled by the guide means. Other positioning means such as flexures, four bar linkages, or linear bearings could also be used while maintaining the key features of this invention. The force application means must also provide sufficient acceleration during the weld pulse to maintain appropriate force on the weldment during the melting of the weld material.

The preferred embodiment uses a computer, programmable logic controller or micro-controller or logic to sequence the charging of the energy storage array 82 and the application and release of force onto the weld electrodes as well as the discharge of energy into the parts to be welded. However, any timing means such as vacuum tube, solid state or mechanical timers will satisfy the requirements for this invention.

The energy storage capacitors in array 82 may be divided into banks, each discharged into the welding output transformer simultaneously or sequentially to provide adjustable output pulse shape. Other forms of energy storage such as batteries, flywheels, and homopolar generators can also be used for energy storage. The thermal profile of the weld over time can be controlled by profiling the current amplitude as a function of time using the computer or micro-controller to sequence a series of capacitor discharge pulses or an inductor can be connected in series with the primary of the transformer, allowing preweld pulses, post-weld anneal pulses or pulse lengthening. Typically current risetimes of 1 to 10 milliseconds are used and current duration of 5 to 50 milliseconds is used to form a weld. In an alternative form of this invention, weld energy can be taken directly from the mains, obviating the need to store energy.

A high permeability tape wound core (used in the preferred embodiment) has sufficient core cross section such that the flux change from reversed magnetic saturation to forward magnetic saturation over a time period of between five and fifty milliseconds generates the necessary output pulse current. In the most preferred form, the core is typically wound as a continuous ribbon of silicon steel or other high permeability material to minimize the magnetomotive force required to maintain reverse saturation. The core may have been cut and reassembled to allow easy assembly. The area of the cross section of the core is determined by the output voltage and output pulse time required, and the flux density capability of the core material. The number of ampere-turns required to saturate the core in the reversed direction prior to the discharge pulse is proportional to the length of the core and inversely proportional to the permeability of the core. Another preferred property of the core material which is required to maintain compact size is high saturation flux density.

The flux reversal power supply provides reversed current to a winding on the core which may be the primary winding to provide the appropriate number of ampere turns to reverse saturate the core immediately prior to the discharge of the main weld pulse. Generally the power required for reverse saturation is much less than 1 percent of that required for welding. Reversed saturation provides a quadrupling of the pulse power from any given transformer by doubling the available flux change and provides higher efficiency from the transformer due to the lower winding resistance than would exist with the longer path length around a larger core. The power supply which provides the reverse saturation magnetizing current is electrically disconnected from the output transformer primary immediately prior to the main discharge pulse in order to prevent damage to it from the main discharge pulse and to prevent power loss otherwise available to make the weld.

A secondary winding is positioned inside each primary winding such that the current induced into each secondary winding provides a repelling magnetic field which partially shields the core from the full magnetic effect that is generated by the primary winding, allowing a smaller, lighter core than employed by prior art machines. In order for the secondary to act as an effective shield, the secondary circuit has low resistance and inductance. The presence of low secondary reactance also improves the overall efficiency of the welding system and provides inherent regulation of the weld current. In contrast, conventional welding pulse transformers use secondary windings located outside or adjacent to the primary windings. As one feature of the present invention, a novel means for connecting to the high cross sectional area secondary is used. A U-channel cross section element provides access from the inner secondary conductor to the secondary bus. With that configuration, the secondary of the transformer is an integral part of the welding head, which minimizes the losses which would otherwise occur in the resistance and inductance in the connection between the transformer and weld head. Inductance minimization is also facilitated through the use of a retrace conductor carrying the return current from the weld head that is close proximity to the flexible connection to the upper weld electrode holder. The retrace conductor can be configured such that the forces generated by the currents flowing in the conductors add to the clamping forces. This arrangement is most useful when large currents are required into the weld head. Other arrangements allow control of forces generated by welding currents to be directed as desired. The vertical portions of the U-channel provide enhanced shielding of the core from the field generated by the primary winding. The outer portion of the secondary U-channel may be connected to totally enclose the primary to further enhance the primary shielding.

Multiple winding pairs, each consisting of a secondary and primary disposed around the perimeter of the core may be added to increase the capacity of the apparatus to levels exceeding current state of the art. Winding pairs are disposed along the perimeter of said core at intervals so as to provide current in the proper placement to join the parts to be welded. The windings can be placed symmetrically to cancel forces normal to the desired welding force if more than one flexible conductor to the weld electrode is used. The core is of sufficient length to allow as many winding pairs as are desired for the total output current of the apparatus. An alternate configuration utilizes separate magnetic cores for each winding pair. For each of the secondary windings, there is a corresponding connecting link or bus from one side of the secondary winding to an upper welding electrode and a second connection from the other side of the secondary winding to a lower welding electrode. To maximize the efficiency of the apparatus, a retrace conductor can be used to carry return current from the weld head back to the transformer. In the preferred forms of the invention, the connections from the secondary windings to the weld electrodes are constructed in such a manner so as to minimize the impedance of the secondary circuit to both increase the output current by minimizing inductive loss and lowering the required secondary voltage to allow use of a lighter core. Simple versions of the invention can be constructed without secondary conductor current retrace when reduced efficiency is not a major concern or lower output currents are desired.

Each secondary winding has a primary winding outside it, constructed of a relatively wide, thin electrically insulated conductor in close proximity to its corresponding secondary winding so as to minimize both the primary inductance and the leakage inductance between the primary and secondary winding. The welding electrodes are mounted onto electrode supports which provide accurate inter-electrode alignment, provide static electrode clamping force and provide sufficiently high acceleration to minimize clamping force losses due to the motion associated with melting of the weld. When weld times are measured in milliseconds, the mass of moving electrodes must be minimized in order to maintain clamping force during this short weld pulse period. A provision for maintaining cylindrical alignment allows non-axially symmetric electrodes to be used. A bilaterally symmetric frame maintains parallelism of electrode surfaces during both static and dynamic welding forces. An elastic member may be interposed in the force path to maintain substantially constant force during the time interval that the weldment is in motion due to the melting of the parent materials. Another method of maintaining controlled force during collapse of the weldment is by using active system such as a solenoid to maintain the force.

One preferred embodiment utilizes a core cross section of 9 square inches. The inner secondary winding is fabricated from 3/4 by 5 inch copper bus bar, and the primary winding are comprised of 0.015 by 3 inch insulated copper ribbon. These welders produce welding currents exceeding 75,000 amperes per winding pair. That is, a welder comprised of two of these winding pairs on either a single, or dual magnetic cores, will deliver welding current exceeding 150,000 amperes.

The electrical output impedance of welding machines constructed according the principles of the invention, is very low, typically in the micro ohm range. With that impedance, voltage source driving the apparatus acts substantially as the constant voltage source when utilized to produce welds of relatively low impedance. When welds are made by a low impedance voltage source, the occurrence of expulsion is minimized because the welding current is modulated by both the static resistance as well as the dynamically changing resistance of the weld. Thus, as the resistance of weld changes due to material composition, geometrical variations, contamination, etc. the welding current changes in the appropriate direction to compensate for these variables. Conventional, higher output impedance welders do not display this property in low impedance welds, because, to a low impedance weld, they act like a constant current source. A constant current weld source will not modulate current flow to compensate for either statically or dynamically changing weldment resistance caused by the variables described herein.

The principles of the invention may be utilized to construct welding machines of any desired current output.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description. All changes that come within the meaning and range of the equivalency of the claims are therefore intended to be embraced therein.

What is claimed is:

1. A high current, low voltage pulse generating system comprising:

A. a high permeability core;
   B. an inner low inductance secondary winding extending between two ends thereof and disposed about the core;
   C. an outer low inductance primary winding disposed about the secondary winding extending between two ends thereof and disposed about the secondary winding, wherein said secondary ends are adapted for coupling across a low impedance structure, and wherein primary ends are adapted for being driven by a succession of voltage pulses; and wherein said voltage pulse generator provides a first polarity voltage level at an amplitude and for a duration to establish reverse saturation in said core, followed by a second polarity voltage pulse having an amplitude and duration sufficient to generate high current low voltage across said secondary ends.

2. A system according to claim 1 wherein said core is toroidal.

3. A system according to claim 1 wherein said primary winding and said secondary winding are characterized by relatively low resistance and relatively low inductance, and wherein the core is shielded substantially from the primary winding magnetic flux.

4. A system according to claim 1 where the secondary winding substantially completely encloses the primary winding.

5. A system according to claim 1 further comprising a voltage source coupled across the ends of the primary winding, and a switch for controlling said voltage source to selectively drive said core into reverse saturation and then to drive the core to forward saturation.

6. A system according to claim 1 where the inductance of the secondary winding is minimized by providing a secondary bus geometry coupled between the ends of the secondary winding and an electrically conductive structure-to-be-joined, such that when the secondary bus is electrically coupled to the structure-to-be-joined in preparation to welding, the window in which a magnetic field can exist is minimized.

7. A system according to claim 1 further comprising a voltage source coupled across the ends of the primary winding, wherein the voltage source includes energy storage capacitors to provide voltage to the ends.

8. A system according to claim 1 further comprising a voltage source coupled across the ends of the primary winding, wherein the voltage source is switched directly from power mains to provide voltage to the ends.

9. A system according to claim 1 further comprising a voltage source coupled across the ends of the primary winding, wherein the voltage source includes a mechanical energy storage device for providing voltage to the ends.

10. A system according to claim 1 wherein a pair of welding electrodes are connected to the respective ends of the secondary winding.

11. A system according to claim 1 wherein high current carrying bus bars are not required to penetrate the wall of an environmental chamber.

12. A system according to claim 1 further comprising means for regulating current between the ends of the secondary winding in response to detected impedance across said ends.

13. A system according to claim 1 further comprising a voltage source coupled across the ends of said primary winding whereby both the pulse width and the current amplitude across an impedance coupled across the ends of the secondary winding, is selectively controlled.

14. A system according to claim 1 further comprising a voltage source coupled across the ends of the primary winding wherein said voltage source provides AC voltage of 120 Volts and current of 15 Amperes to said primary winding.

15. A system according to claim 1 providing high current, constant voltage pulses to said low impedance structure and wherein said high current pulses comprise an amplitude between 1,000 amperes and 5,000,000 amperes and adjustable width.

16. A welding system comprising:
A. a high permeability toroidal core;
B. at least one low inductance primary winding disposed about the core,
C. at least one low inductance secondary winding for coupling across a weldment and disposed between the primary winding and the core,
D. a reverse core saturation means and an external inductor connected between a switch and the primary winding such as to provide an increase in the weld current rise time.

17. A welding system comprising:
A. a high permeability toroidal core;
B. at least one low inductance primary winding disposed about the core;
C. two or more low inductance secondary windings disposed between the primary winding and the core;
D. a reverse core saturation means.

18. A welding system comprising:
A. at least two high permeability toroidal cores;
B. at least two low inductance primary windings disposed about the cores;
C. at least two low inductance secondary windings disposed between the primary windings and the cores,
D. a reverse core saturation means; wherein individual cores are used for each of the winding pairs.

19. A welding system comprising a transformer wherein said transformer comprises:
A. a high permeability core;
B. an inner low inductance secondary winding extending between two ends thereof and disposed about the core; and
C. an outer low inductance primary winding disposed about the secondary winding extending between two ends thereof and disposed about the secondary winding, wherein said secondary ends are adapted far coupling across a low impedance structure, and said primary ends are adapted for being driven by a succession of voltage pulses and wherein said primary winding and said secondary winding are characterized by relatively low resistance and relatively low inductance, and wherein the core is shielded substantially from the primary winding magnetic flux.

20. A system according to claim 19 further comprising a secondary bus geometry coupled between the ends of the secondary winding and said low impedance structure, such that when the secondary bus is electrically coupled to said low impedance structure in preparation to welding, the window in which a magnetic field can exist is minimized.

* * * * *